No. 800,587. PATENTED SEPT. 26, 1905.
R. F. MERRIAM.
RECEPTACLE FOR CHEMICAL INK ERASERS.
APPLICATION FILED JAN. 9, 1905.

Witnesses
Robert A. Boswell
A. L. Hough

Inventor
R. F. Merriam,
By Franklin H. Hough
Attorney

UNITED STATES PATENT OFFICE.

RAYMOND FOGG MERRIAM, OF MINNEAPOLIS, MINNESOTA.

RECEPTACLE FOR CHEMICAL INK-ERASERS.

No. 800,587.  Specification of Letters Patent.  Patented Sept. 26, 1905.

Application filed January 9, 1905. Serial No. 240,315.

*To all whom it may concern:*

Be it known that I, RAYMOND FOGG MERRIAM, a citizen of the United States, residing at Minneapolis, in the county of Hennepin and State of Minnesota, have invented certain new and useful Improvements in Receptacles for Chemical Ink-Erasers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in receptacles for liquids used for erasing ink-markings; and the object of the invention is to produce a simple and efficient device of this character comprising a compartment-receptacle the ends of which are turned to form noses, whereby the liquid may be conveniently applied, and in the provision of a casing surrounding the receptacle and provided with a flat surface adapted to carry an absorbent material.

The invention consists, further, in various details of construction and arrangements of parts, as will be hereinafter fully described and then specifically defined in the appended claims.

My invention is illustrated in the accompanying drawings, in which—

Figure 1:
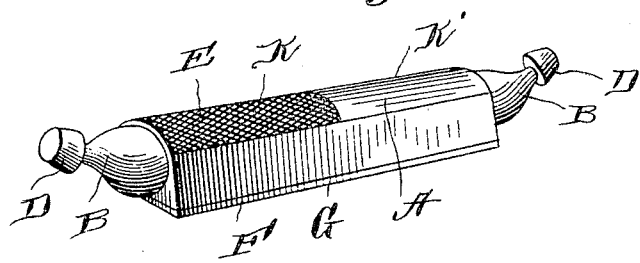
Figure 2:
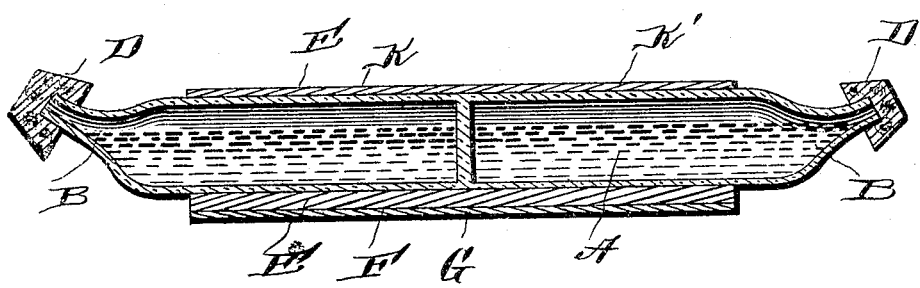
Figure 3:
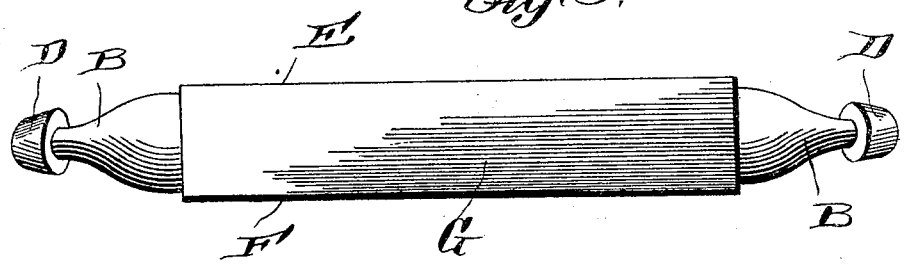

Figure 1 is a perspective view of my improved ink-eraser. Fig. 2 is a sectional view longitudinally through the same, and Fig. 3 is a bottom plan view.

Reference now being had to the details of the drawings by letter, A represents a two-compartment receptacle, the outer end of each compartment tapering to a nose B, through which the liquid contained in the compartments may be dispensed.

D designates a cork which is fitted over the exit end of each compartment when not in use. Said compartment-receptacle may be of any shape, either cylindrical or square, and E designates a casing which is adapted to cover substantially the entire length of the compartment-receptacle excepting the tapering nose portions, which project beyond the ends of the casing and are slightly upwardly inclined, as shown in the sectional view of the drawings. The bottom of said casing is flat, as at F, and G designates a sheet of absorbent material, as blotting-paper, which is fastened to said flat portion and is adapted to absorb any excess of liquid which may be coated over a surface from which ink-markings are to be erased. It is my purpose to cover the outer surface of the casing of the receptacle with marks of distinction, whereby the liquids in the two compartments may be readily distinguished—for instance, one-half of the casing, designated by letter K, may be of one color, while a coating K' for the other receptacle may be of another color.

By the provision of the device shown and described it will be observed that a simple and efficient means is provided for quickly removing the ink-markings, one compartment of the receptacle being adapted to contain an acid, while the other contains an alkaline solution.

While I have shown a particular form of device embodying the features of my invention, it will be observed that I may vary the details of the same, if desired, without in any way departing from the spirit of the invention.

Having thus fully described my invention, what I claim as new, and desire to secure by Letters Patent, is—

1. An ink-eraser comprising a two-compartment receptacle, a casing for said receptacle, said receptacle having tapering ends projecting beyond the ends of said casing, and an absorbent material carried by the bottom of said casing, as set forth.

2. An ink-eraser comprising a two-compartment receptacle, a casing for said receptacle, said receptacle having tapering ends projecting beyond the ends of said casing, the bottom of the casing being flat, an absorbent sheet secured to said flattened surface, the outer surface of said casing having distinctive coverings, whereby the liquids in the two compartments may be distinguished, as set forth.

In testimony whereof I hereunto affix my signature in presence of two witnesses.

RAYMOND FOGG MERRIAM.

Witnesses:
 GEO. F. ROWAN,
 S. A. WOOD.